No. 884,058. PATENTED APR. 7, 1908.
C. W. WELLMAN.
TURBINE.
APPLICATION FILED MAY 14, 1906.
3 SHEETS—SHEET 2.
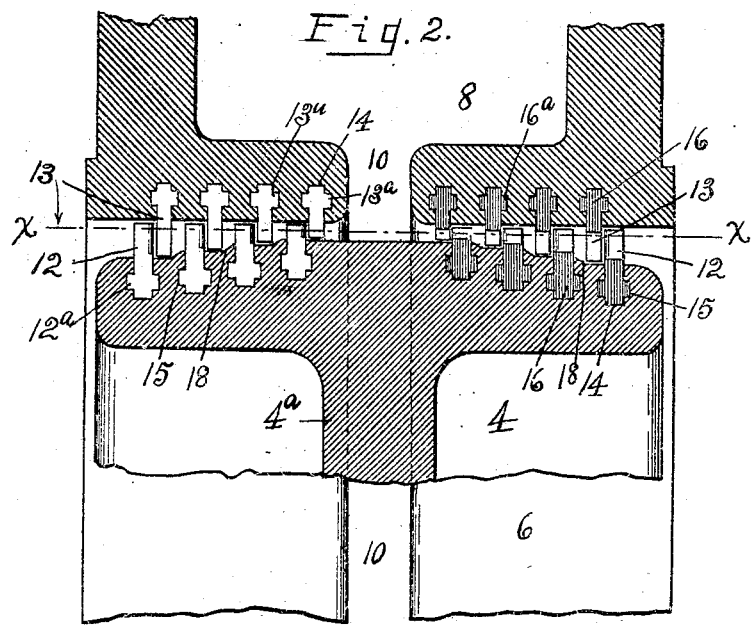
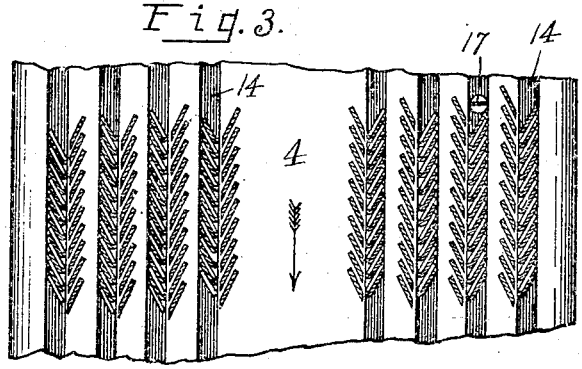
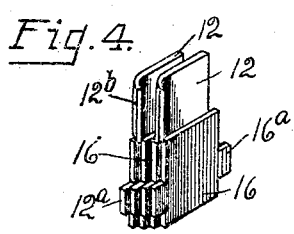
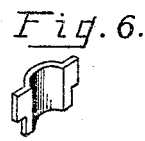
WITNESSES:
D. C. Walter
Hazel B. Hiett
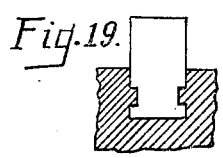
INVENTOR.
Calvin W. Wellman
By Owen & Owen,
his attorneys.

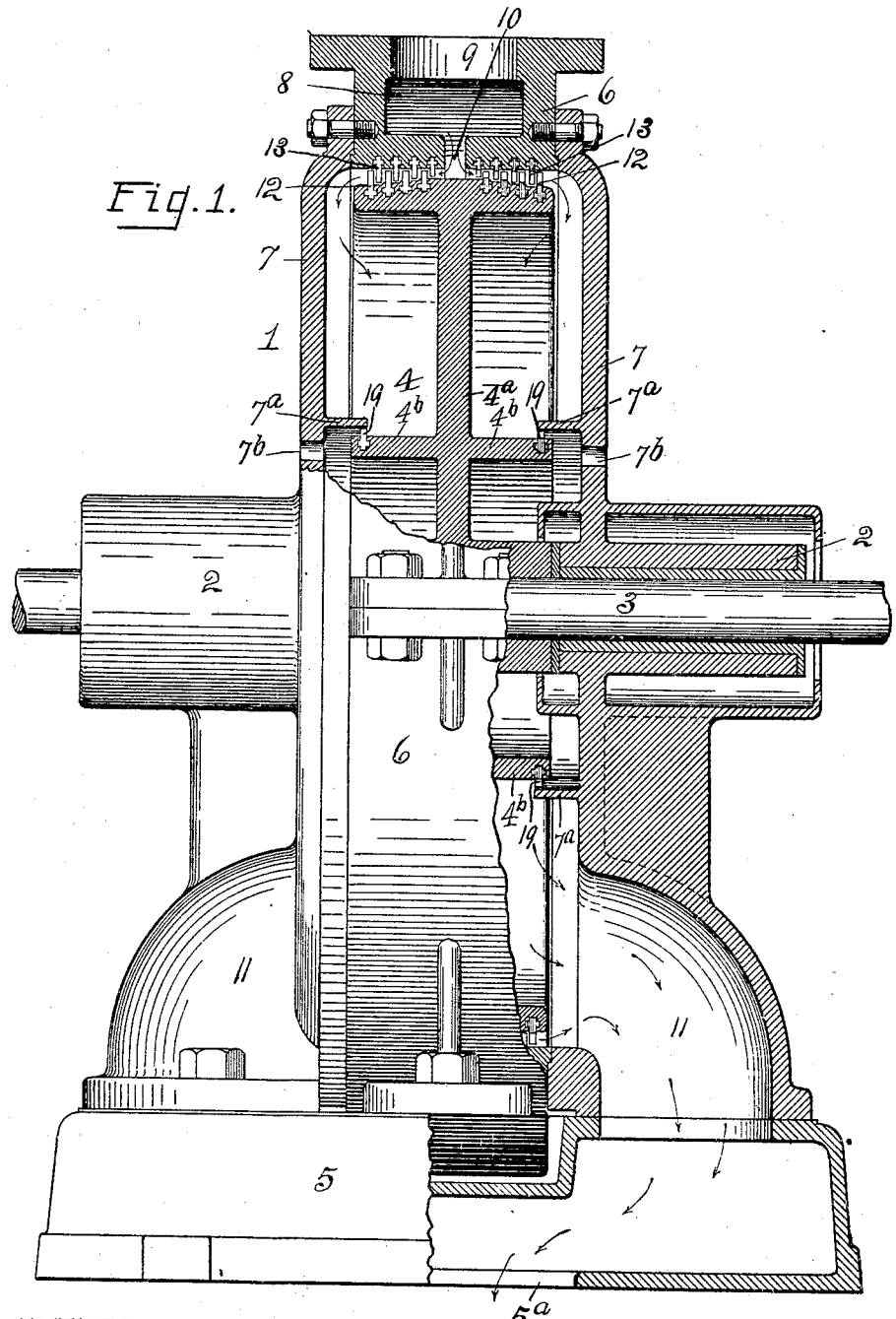

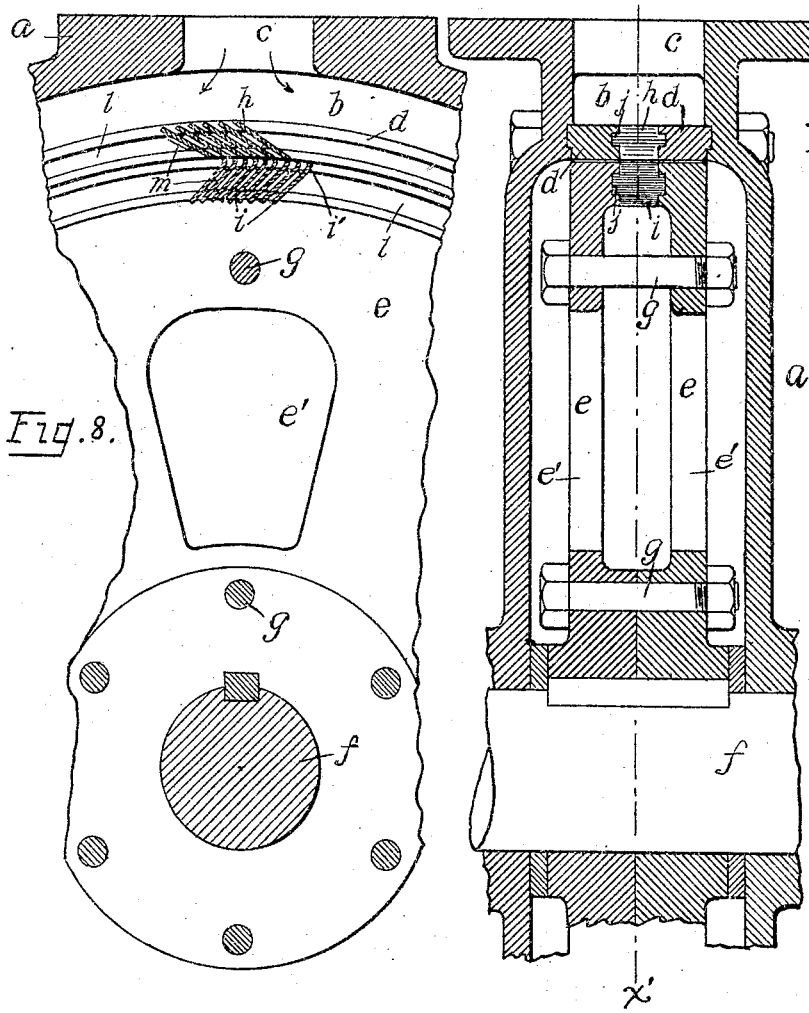

UNITED STATES PATENT OFFICE.

CALVIN W. WELLMAN, OF TOLEDO, OHIO, ASSIGNOR TO HATTIE MAY WELLMAN, OF SOUTH BOARDMAN, MICHIGAN.

TURBINE.

No. 884,058.　　　Specification of Letters Patent.　　　Patented April 7, 1908.

Application filed May 14, 1906. Serial No. 316,725.

*To all whom it may concern:*

Be it known that I, CALVIN W. WELLMAN, a citizen of the United States, and a resident of Toledo, in the county of Lucas and State of Ohio, have invented a certain new and Improved Turbine; and I do hereby declare the following to be a full, clear, and exact description of the invention, such as will enable others skilled in the art to which it appertains to make and use the same; reference being had to the accompanying drawings, and to the figures and letters of reference marked thereon, which form a part of this specification.

My invention relates to turbines adapted to be operated by steam, gases, water or other fluid under pressure.

The primary object of my invention is to so construct and arrange the blades of the rotary and stationary parts of the turbine relative to each other as to materially increase the power efficiency of a unit with a minimum consumption of fuel, thus enhancing its commercial value.

It is also the object of my invention to provide a turbine of cheap, simple and durable construction which may be operated as economically under a low pressure as under a high pressure proportional to the power generated, and which will require less steam for operating it than has heretofore been possible in turbines of like horsepower.

The invention is fully described in the following specification, and illustrated in the accompanying drawings, in which,—

Figure 1 is a front elevation of the turbine embodying my invention, with a portion thereof shown in central vertical cross-section. Fig. 2 is a cross section of a portion of the housing and inclosed rotary-head or wheel, showing the relative positions of the rows of fixed and movable blades. Fig. 3 is a circular section taken on the dotted line *x x* in Fig. 2 showing the spacing of blades of the same rows and the relative positions of the rows of fixed blades to the rows of movable blades. Fig. 4 is an enlarged perspective view of two movable blades and their spacing elements. Figs. 5 and 6 are enlarged perspective views of a blade and its spacing member of the crescent type provided with my improved locking means. Fig. 7 is a vertical cross-section of a portion of a modified form of my turbine equipped with a single row each of fixed and movable blades arranged in superimposed relation. Fig. 8 is a section taken on the dotted line *x'* in Fig. 7, with a portion of the fixed and movable blades shown in proper relative positions. Figs. 9, 10, 11 and 12 are cross-sectional views of different modified forms of blades. Figs. 13, 14, 15 and 16 are elevations of the same, respectively. Figs. 17 and 18 are longitudinal sections of two different modified forms of blades, and Fig. 19 is another modification of a blade with a portion of its receiving part.

Referring to the drawings, 1 indicates the casing or housing of my turbine, which is provided at its sides with suitable bearings 2 for receiving the shaft 3 carrying the rotary-head or wheel 4 within the housing. This housing is mounted on a suitable base 5, and for the purpose of convenience of assembling and construction comprises the circumferential or ring portion 6, which encircles the circumference of the rotary-head or wheel 4, and the side portions 7 7, which fit to and are securely bolted or otherwise suitably secured to the sides of the ring 6, forming tight joints therewith. The ring 6 is formed with an annular steam chest or chamber 8 extending entirely therearound, which receives its supply of steam or other actuating fluid through an opening 9 therein, having proper communication with a source of supply, and has its discharge to the interior of the housing and against the periphery of the rotary-head or wheel 4 through either an annular slot or a plurality of openings 10 provided through the inner wall of the ring casing. The exhaust from the interior of the housing takes place through the conduits 11 11 formed in the lower portions of the sides 7, which conduits have their discharge into the hollow base 5, which communicates through the opening $5^a$ in its bottom with an exhaust pipe (not shown).

The rotary-head or turbine wheel 4 has its rim portion broadened to a width suitable to accommodate the number of rows of blades desired to be employed thereon and supported from its hub by the centrally disposed disk portion $4^a$, which forms a dividing partition within the housing. I do not wish to restrict myself to this form of head as any suitable construction may be employed. Extending around the circumference of the rotary-head 4 on either side of its center are one or more rows of blades 12, which alternate with rows of fixed blades 13 secured to the inner circumference of the housing 1 at the sides of the steam discharge slot or openings 10 therein, as shown in Figs. 1, 2 and 3.

The blades 12 and 13, which form the primary features of my invention, are preferably constructed of plain or rolled sheet metal stamped in the form of a Latin cross, or in other words with oblong body portions having one or two ears 12ª and 13ª, respectively, projecting laterally therefrom adjacent their bases, as shown. These blades are secured within annular grooves 14 provided in their proper receiving parts and have their ears 12ª and 13ª locking within registering grooves 15 formed in the opposite walls of said grooves 14. If desired, the blades may be provided with the notches and the groove with registering ribs as shown in Fig. 19. In order to cause the blades to stand obliquely to their grooves, said grooves are made of less width than the blades, as shown in Fig. 3. In positioning the blades within their respective grooves one is placed therein so that its width stands approximately longitudinally therewith and is then turned as much as the width of the groove will permit so that it stands obliquely to the groove and its ears project within the side grooves 15 and prevent an outward withdrawal of the blade. A spacing member 16, which is of similar shape and construction to the blades 12 and 13 except that its body portion is shortened to provide an opening or passageway between the exposed ends of the spaced blades, is then dropped within the groove and turned into flush position with the side of the blade previously set with its ears 16ª locking in the grooves 15 in like manner to those of said blade. A second blade is now set within the groove in close abutment with the spacing member, and this is repeated until the groove has been filled, thus filling each groove with a series of alternately positioned blades and spacing members which closely abut each other.

When the setting of a row of blades is started the first is prevented from rearward displacement by a plug or screw, which is secured within the groove in abutment with the rear of such blade, as shown at 17 in Fig. 3. The associated rows of fixed and movable blades are reversely positioned or set in intersecting planes, as shown in Fig. 3, to cause the steam or other pressure fluid which is driven between the blades 13 to have direct impingement with the faces of the movable blades 12 and have their inner or contiguous edges disposed in close relation. To facilitate and enhance the impinging force of the jets of steam or other fluid against the faces of the movable blades, these blades have their inner edges curved slightly rearwardly, as shown at 12ᵇ in Fig. 4, to form elongated cups or pockets therein which aline with and receive the full force of the pressure fluid. This method of securing the blades to their parts is not confined to the use of what may be termed flat blades, as shown in Figs. 1, 2, 3, and 4, but may also be employed in connection with crescent or other blades of the bucket type. A crescent blade and its spacing member adapted for this manner of fastening are shown in Figs. 5 and 6.

Further modifications of the blades in which the spacing members are illustrated as being formed integral therewith are shown in Figs. 9 to 17, inclusive, some being stamped and others rolled or drop forged. In Figs. 9 to 16 the ears of the blades are shown as being thickened in different ways to cause the major portions of the blades to be properly spaced apart, while in Figs. 17 and 18 the exposed or projecting portions of the blades are shown as being of less thickness than the portions thereof which extend within the receiving grooves.

The periphery of the rotary-head or wheel 4 is annularly stepped on each side of its center, as shown at 18 in Fig. 2, to slightly reduce its diameter outwardly from its center or the point of entrance of the operating fluid for each row of blades thereon, so as to permit a multiple expansion of the fluid as it passes through the several rows of blades. The blades 12 and 13 of each row have their exposed portions lengthened in the same proportion that the surface of the rotary-head is reduced, thus increasing the fluid impinging surface of the blades to accommodate the fluid expansion. The horsepower of the turbine may be increased or diminished by increasing or diminishing the space between the periphery of the wheel 4 and the inner circumference of the housing 1 and correspondingly increasing the lengths of the blades 12 and 13.

The communicating slot or openings between the chamber and interior of the housing 1 causes the operating fluid to strike the first row of blades on either side of such slot or openings at boiler or initial pressure and after it has spent its force on the several rows of blades it is discharged around the rim of the rotary-head or wheel 4 and into the chambers formed within the housing either side of the disk portion 4ª, whence passes through the exhaust conduits 11 and finally out through the exhaust opening 5ª in the base 5.

In order to prevent the escape of any the exhaust products through the shaft bearings of the housing, I provide the disk portion 4ª of the wheel 4 adjacent its hub with the two oppositely extending annular flanges 4ᵇ, which have their rims each passing freely within an annular flange 7ª formed internally on the contiguous side 7 of the housing, as shown in Fig. 1. A centrifugal draft is now created through the openings 7ᵇ in the sides of the housing, which are provided for that purpose, and between the contiguous faces of the flanges 4ᵇ and 7ᵃ due to the positioning in each of such spaces of an annular row of blades 19, which are disposed to act as fan blades having an inward suction. These blades may be secured to the flange 4ᵇ in the same manner as above described for the blades 12 and 13, or in any other suitable manner, and be of any suitable construction.

In Figs. 7 and 8, which illustrate a modification of the construction of my turbine and the relative manner of positioning the fixed and movable blades therein, $a$ indicates the housing, $b$ the annular chamber encircling the same, which is provided with the intake opening $c$ and is separated from the interior of the housing by the two part annular ring $d$, and $e$ the rotary-head or wheel, which is carried by the shaft $f$ and formed in two separable sections, which are secured together by bolts $g$. In this construction the fixed blades $h$ and movable blades $i$, which are of similar construction to the blades 12 and 13, are mounted in direct superimposed relation so that the blades $i$ revolve with their outer or curved edges $i'$ in contiguous position to the inner edges of the fixed blades $h$. These blades are secured between the contiguous edges of the ring parts $d$ and those of the rims of the two wheel parts $e$ in the same or a similar manner to that employed for securing the blades 12 and 13 to their parts, the ears $j$ thereof being locked within the slots $l$ in the sides of said ring and wheel parts, as shown. Either separate or integral spacing members $m$ are provided between the securing edges of the blades. The operating fluid, after acting on the blades, passes within the rotary-head or wheel $e$, thence through the openings $e'$ in said wheel and finally has its discharge from the housing $a$ through a suitable exhaust-opening therein (not shown).

With the construction and arrangement of blades shown and described it is found in actual practice that three or four rows, or rather pairs of rows thereof, on each side of the slot or openings 10 in the housing are as efficient in horse-power generated as fifty or sixty rows of the blades employed in the Parson type of turbine, which is presumably due to the dividing of the operating fluid into a multiplicity of jets at boiler or initial pressure as soon as it strikes the first or inner rows of fixed blades 13 and causing these jets to impinge directly upon the curved or cup-like portions 12ᵇ of the movable blades 12. The broadened diagonal surfaces leading from the cups 12ᵃ of the blades 12 also add materially to the power efficiency of the turbine. It will be apparent that the blades of each pair of rows present somewhat enlarged operating surfaces over those of the preceding rows to allow for the expansion of the fluid, and also that the shaft bearings are free from stuffing due to the directing of the exhaust therefrom as shown. It is also found in practice that this construction of turbine can be operated as economically as a reciprocating engine unit of the same capacity, and that it will operate as economically under a low pressure as under a high pressure.

I wish it to be understood that I do not desire to be limited to the exact details of construction shown and described, for obvious modifications will occur to a person skilled in the art.

Having thus described my invention, what I claim as new and desire to secure by Letters Patent, is,—

1. The combination with a blade receiving part of a turbine having a portion shaped to receive and interlock with a blade, of a plurality of blades each shaped to be inserted within said blade-receiving portion in one position relative thereto and to interlock therewith when turned into diagonal relation thereto, said blades when positioned all standing successively in the same relative order to the turbine part and their fluid contacting surfaces spaced from each other.

2. The combination with a blade-receiving part of a turbine having a portion shaped to receive and interlock with a blade, and a plurality of blades each shaped to be inserted within said blade-receiving portion in one position relative thereto and to interlock therewith to prevent withdrawal when turned into diagonal relation thereto, and a spacing member inserted between the base portions of each two blades, said members being of like construction to the blades and adapted to interlock with the turbine part in substantially the same manner.

3. The combination with the housing and rotary-head of a turbine, of a row of blades secured to each in contiguous position, the fixed blades being substantially flat in cross-section and placed in contiguous consecutive order whereby to divide the operating fluid into a multiplicity of jets, and the movable blades being positioned in intersecting planes with the fixed blades and having their major portions substantially flat in cross-section and one of their edges formed with lips to receive the direct thrust of the fluid jets.

4. The combination with the housing and rotary-head of a turbine, of annular flanges formed on the head and housing concentrically with the head bearing and in contiguous position, and means carried by the flange of the head for creating a centrifugal draft between the contiguous edges of the flanges.

5. The combination with the housing and rotary-head having flanges disposed in contiguous position concentric with the head bearing, of fan blades positioned on the head flange within the space between the flanges for preventing an escape of fluid therethrough when the head is in motion.

In testimony whereof I have hereunto signed my name to this specification in the presence of two subscribing witnesses.

CALVIN W. WELLMAN

Witnesses:
C. W. OWEN,
HAZEL B. HIETT.